United States Patent [19]

Hollis

[11] 4,070,769
[45] Jan. 31, 1978

[54] DIGITAL RADAR TARGET GENERATOR

[75] Inventor: Ernest E. Hollis, Bedford, Mass.

[73] Assignee: Sanders Associates, Inc., Nashua, N.H.

[21] Appl. No.: 708,656

[22] Filed: July 26, 1976

[51] Int. Cl.² .............................................. G01S 9/00
[52] U.S. Cl. .................................................... 35/10.4
[58] Field of Search ....................................... 35/10.4

[56] References Cited

U.S. PATENT DOCUMENTS

| 3,446,903 | 5/1969 | Bezzer | 35/10.4 |
| 3,514,521 | 5/1970 | Burchard et al. | 35/10.4 |
| 3,571,479 | 3/1971 | Horattas et al. | 35/10.4 |
| 3,573,339 | 4/1971 | Flower et al. | 35/10.4 |
| 3,783,172 | 1/1974 | Bernstein | 35/10.4 |

*Primary Examiner*—Malcolm F. Hubler
*Attorney, Agent, or Firm*—Louis Etlinger; Joseph E. Funk

[57] ABSTRACT

Apparatus is disclosed which generates simulated radar target signal returns that are input to radar equipment to test the equipment and to train radar operators. A small number of individual simulated radar target signal scenarios are provided which are easily selectively combined to provide a large plurality of training scenarios on a radar display. The equipment provides such features as multiple aircraft display, terrain masking, variable target size, range gate splitting, identification friend or foe, and ambiguity checking. The radar signal generator apparatus utilizes a stored binary data word representing each simulated radar target trace and each data word contains bit fields for each of the above target features as well as the simulated target position on the radar display indicator. A single counter driven by the radar system clock is used to generate binary numbers that are compared to the target position information of each stored target data word. Upon a comparison match the radar display writing beam is intensified to trace the simulated radar target with the trace width specified by the appropriate bit field of the associated data word.

11 Claims, 6 Drawing Figures

DIGITAL RADAR TARGET GENERATOR

FIELD OF THE INVENTION

This invention relates to devices generating signals that simulate radar signal returns.

BACKGROUND OF THE INVENTION

In the prior art radar operators were often trained on radar equipment and a target aircraft would be flown on a predetermined path while performing predetermined maneuvers within the operational range of the radar. This type of training is very costly due to the high cost of operating aircraft, and such training must be scheduled in advance. Due to these factors and the difficulty of scheduling more than one aircraft at a time for radar operator training, multiple target training has been extremely limited and is usually obtained only when the radar operator is working with real lift situations such as near an airport. When emergency situations arise involving multiple aircraft, and possibly under adverse operating conditions for both the radar equipment and the aircraft, lack of multiple target training for the radar operator can result in the increase of the changes of an air accident that might otherwise be avoided if a more experienced operator had been operating the radar equipment. Further, live aircraft maneuvering is often not repeatable enough when evaluating radar operators or competing radar systems and displays.

As a result of the shortcomings of radar operator training utilizing actual aircraft as detailed above, equipment has been developed to generate simulated radar target return signals that are input to the radar equipment to display the nonexistent training aircraft on the radar plan position indicator for training and testing purposes. In addition, multiple aircraft can be more easily simulated. Such equipment for generating simulated target returns also eliminates the scheduling problems of using real aircraft for training and the attendant cost thereof. Further, this simulated radar display equipment can be utilized at any time of the day or night at any location where there is radar equipment or even simply a PPI console. Live targets, where available, are easily intermixed with the simulated targets.

There are shortcomings, however, in the prior art simulated radar display equipment resulting in a lack of simulated target reality, except in very complex simulation systems using large real time on line computers. This prior equipment does not provide terrain masking simulation, nor does the equipment provide for multiple target displays due to target causing range gate splitting, nor does this prior art equipment provide manual or automatic ambiguity checking. In addition, the prior art simulated radar display equipment does not provide variable target size to simulate coincident targets, different size targets and turning targets presenting varying physical profile to the radar beam. Further, the prior art simulated radar display equipment does not provide simulation of antenna drive motor speed variations caused by wind loading, and does not provide simulated displays reflecting different antenna rotational speeds.

In the prior art, generation of simulated multiple target displays required relatively extensive use of a large computer with the attendant operating and programming costs thereof. The computer is used to generate a target trajectory and each target trajectory is then further processed by the computer to be in the signal format required to be input to the simulated display equipment and then to the radar display equipment. When it is desired to change the trajectory of a target the computer must repeat the generation of the trajectory and the conversion of the trajectory to either polar or rectangular coordinates at appropriate time intervals.

From the above it is apparent that there is a need in the art for improved simulated radar target display equipment that will generate signals to display realistic target scenarios to radar operators for training purposes. In addition, there is a need for simulated radar target display equipment that can easily change target trajectories without the need for an expensive dedicated computer. Such equipment should be inexpensive, small and lightweight to permit its wide usage.

SUMMARY OF THE INVENTION

In accordance with the teaching of my invention I provide new and improved simulated radar target generator equipment that displays realistic target scenarios on radar plan position indicators for the training and evaluation of radar operators and systems.

To accomplish the above I provide a counter that counts for a period equal to the time required for the radar plan position indicator to complete one circular sweep on the display indicator. Thus, there is a count number generated by the counter corresponding to each of a large number of finite positions on the face of the display indicator cathode ray tube.

I provide a plurality of individual target scenarios which may be combinationally selected and interleaved to produce a large number of composite multiple target training scenarios. In addition, selected terrain masking may be interleaved to remove display data from the composite scenario to provide terrain masking.

A target in an individual target scenario has a binary target data word for each trace for each complete rotational scan of the radial trace display beam of the radar plan position indicator. A part or bit field of each word is a binary number that indicates the target position and corresponds to one of the binary numbers that will appear in the aforementioned counter during a complete rotational scan on the face of the indicator. A comparator is used to compare the target position binary number portion of ones of the binary target data words with the contents of the counter and, upon there being a match between the target position binary number and the counter contents, the display electron beam is intensified to display the target.

Other portions or bit fields of each target data word are used to indicate various characteristics of the target to provide a realistic target display. One bit field indicates the azimuth width of the target trace and causes different target trace widths simulating target size and varying target profile to a radar beam. Another bit field indicates whether or not the particular target trace for displaying an ambiguous target which moves from a first to a second display position upon operation of an ambiguity check button by the radar operator as is well known in the art.

As mentioned previously, a large number of multiple target scenarios are easily generated by interleaving combinations of a smaller number of individual target scenarios utilizing a simple microprocessor programmed to interleave the scenarios by target position binary number in a divide obvious to one skilled in the art. In addition, individual target scenarios may be modified to produce an even larger number of possible multiple target scenarios by changing the range of an individual target or by rotating or otherwise changing the trajectory of the target on the radar display indicator. This is easily accomplished using the microprocessor by merely incrementing or decrementing the target position binary number in each binary word for an individual target. The microprocessor may be programmed to do this in a manner well known in the art. As mentioned previously, a counter is used to devide each complete circular sweep and each radial trace thereof of the radar display indicator into a large number of finite points. When each target position binary number is incremented or decremented by a fixed number less than the number of finite points along a single radial trace of the display indicator beam, the target position is merely changed in range. However, if the target position binary number for each target data word of a training scenario is incremented or decremented by a number that is a multiple of the number of finite points along a single radial trace, the target trajectory will be rotated about the radial trace origin point of the face of the radar display indicator. Also, if the position number of each target data word is incremented or decremented by a number that is not such a multiple, the target trajectory will be otherwise translated on the radar display indicator.

My invention will become more apparent upon considering the following detailed description in conjunction with the drawing, in which.

Figure 1:
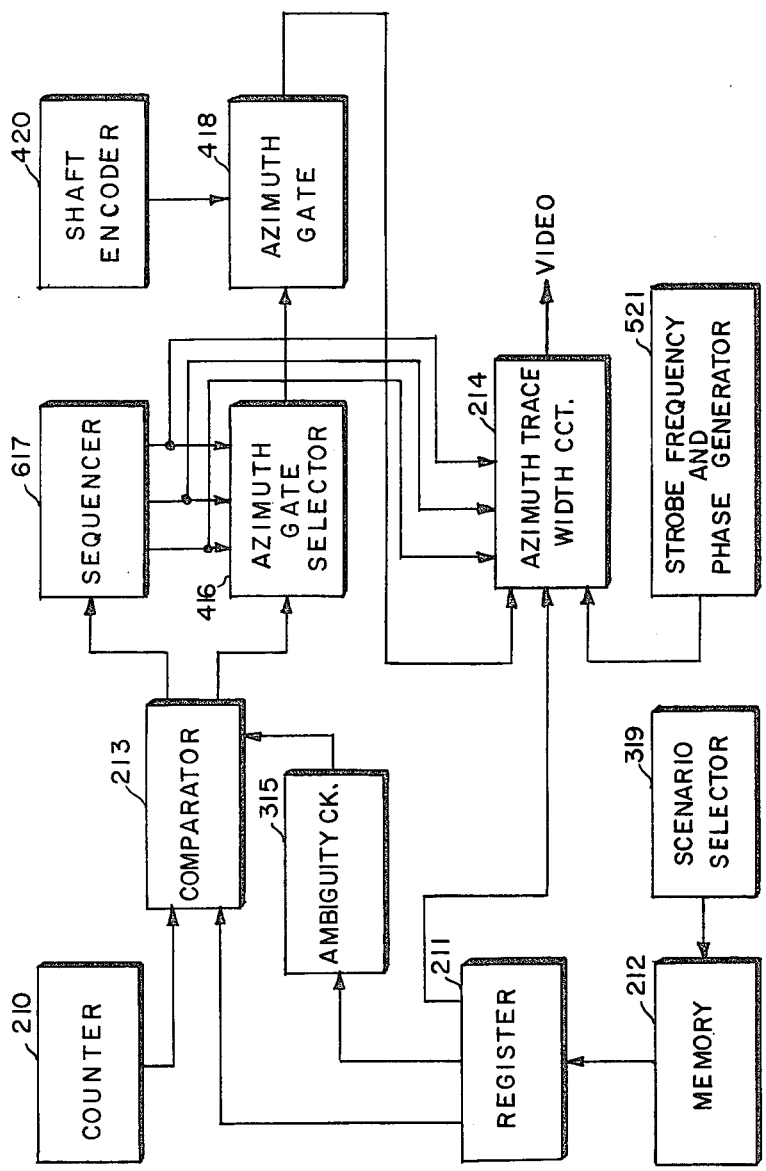
FIG. 1 is a block diagram of my novel simulated radar target generator.

In the detailed description that follows the elements are sequentially numbered but, for ease in locating elements in the drawing, each number contains a single prefix number indicating the figure of the drawing in which the element is located. For instance, sequencer 617 is found in FIG. 6. Azimuth trace width circuit 214 is found in FIG. 2, and ambiguity check circuit 315 is found in FIG. 3.

GENERAL DESCRIPTION

Turning now to the drawing, there is depicted in FIG. 1 a block diagram representation of my novel digitial radar target generator used to train radar operators and check radar equipment operation. FIG. 1 gives an overview of my target generator before a detailed description is given of the details of the individual circuits. Scenario selector 319 is used by the operator of the radar target generator to easily and quickly assemble an almost infinite number of training scenarios to be presented on a radar display indicator (not shown). Within scenario selector 319 are stored a number of individual target training scenarios and terrain masking which are individually selected by the operator of the simulated radar target generator. The operator may easily change each individual target scenario by translation and rotation to produce an almost infinite number of target paths and by providing realistic terrain masking.

A training scenario assembled by the operator utilizing scenario selector 319 is stored in memory 212 where the scenario is read out slowly over the entire time span of the training scenario presented on the radar display indicator to the radar operator. This time span may be thirty minutes, an hour, or more. The scenario is stored in memory 212 as a series of binary target data words, each word containing four fields each containing information in binary bit form. The fields indicate the position of the simulated target to be displayed, the azimuth trace width of the target, whether or not the target is an ambiguous target or a real target, and whether or not the target represents a friend or a foe. These four bit fields of the individual target data words are discussed in detail further in this specification. One by one the target data words stored in memory 212 are transferred into register 211 and then used to display the target as indicated by the four bit fields of the word.

The basic theory of operation of my simulated radar target generator is now briefly described before going on to describe the remaining blocks in FIG. 1 that perform the functions to implement the simulated target signal generation. On the face of a cathode ray tube (CRT) radar display indicator the display electron beam is radially swept from a trace origin which is generally at the center of the display indicator in a manner well known in the art. In radar systems each successive radial trace is displaced from the immediately preceeding radial trace by an angle typically in the order of one hundredth of a degree as chosen in the design of the radar system. As is well known in the art, successive radial traces sweep a complete revolution around the center trace origin point, one complete revolution after another. The sweep angular velocity depends on the rate of rotation of the radar antenna. My novel equipment is driven by an oscillator driven counter 210 which is either driven by or operates in synchronization with the internal oscillator or clock of the radar system. Each count in counter 210 is a binary word which defines a discrete point along each radial trace of the radar indicator display beam and the clock is reset after the radial traces have completed one revolution on the face of the radar display indicator. In the typical embodiment of my invention described herein, counter 210 is used to define fifty points along each radial trace and there are one hundred traces for each degree of angle. In this manner a larger number of display positions on the face of the radar display indicator are indicated by a unique binary number. The binary number found in the target location bit field of each target data word that is transferred into register 211 is used to identify one of the discrete points to be illuminated to display the target. The target data words for a composite scenario are assembled or interleaved by scenario selector 319 and stored in memory 212 such that the binary numbers in the target location bit field of the target data words are arranged in increasing order of magnitude for each complete revolution of the beam on the CRT face. When the binary number in counter 210 matches the binary number in the target location bit field of the target data word stored in register 211, the target represented by the data word is traced on the radar screen. Comparator 213 is used to determine when the binary number stored in counter 210 equals the binary number indicating target location stored in register 211. After a target display on the radar display indicator has been initiated, the next succeeding target data word stored in memory 212 is placed in register 211 and used to display the next target. It is not necessary for the display of one target to be complete before the display of the next is initiated. To illustrate the principles, only three such simultaneous targets are discussed herein. However, the actual number can be as large as desired.

Very frequently returns from a given target will appear in two or more successive range gates. This is called range gate splitting and results in more than one trace being displayed for the single target. Generally the two traces neither beging nor end at the same azimuth. This effect can be simply implemented in either of two ways. The simplest way is to treat the situation as two (three if range gate tripling is to be simulated) independent targets. The count words (binary numbers) representing the multiple traces are part of the data file for a given trajectory. It is also possible to implement them using an additional bit field of the target data word. The additional bit field indicates where the trace which begins at the larger azimuth begins with respect to the first trace displayed.

Terrain masking is easily accomplished by suppressing a range of numbers in the target data word.

It is possible for ambiguous targets to be detected and displayed by most radars. These are targets which reflect energy from a transmitted pulse which occurred earlier than the most immediately preceeding transmitted pulse. Such ambiguous targets are at ranges greater than half the interval between the transmitted pulses divided by the speed of light.

To determine if the multiple traces on the radar screen represents an ambiguous target, the radar operator performs a manual ambiguity check button as is well known in the art. If the target is ambiguous, its radial position changes markedly to a new radial position on the next sweep. In this manner the radar operator knows which of the multiple traces represent ambiguous targets. To simulate this feature with my novel simulated radar target generator two or more target data words are stored in memory 212 for each target having an ambiguous target appearance. As described heretofore, each target data word contains a bit field which indicates whether or not the target is an ambiguous target and this information is used to realistically simulate ambiguous target operation of the radar system. One of the two target data words represents the target trace which will be displayed if an ambiguity check is not being made manually or automatically. However, if an ambiguity check is made, the contents of the ambiguity check bit field of the second target data word will cause the indicated target to be displayed at a different range. This function is performed by ambiguity check circuit 315 and assures that the trace previously present disappears. Range gate splitting for simulated ambiguous targets is implemented the same way as for nonambiguous targets.

This is the general description of operation of the simplest form of my invention, but the operation of the preferred embodiment is described hereinafter. The preferred embodiment merely adds realistic wind loading operation to that portion of the circuit described generally above.

Returning now to the description of the block diagram shown in FIG. 1, and summarizing, I have briefly described how scenario selector 319 is utilized to assemble an almost infinite number of training scenarios which are stored in memory 212. Each target data word of the training scenario stored in memory 212 is sequentially transferred into register 211. The target location bit field of the target data word stored in register 211 is transferred into comparator 213 into which is also coupled the count of counter 210 which is driven by the system clock (not shown). Upon there being a match between the binary number represented by the count in counter 210 and the binary number in the target location bit field, comparator 213 provides an output signal.

Continuing on with the description of FIG. 1, the output signal from comparator 213 is applied to sequencer 617 to provide the aforementioned wind loading feature. Sequencer 617 causes an idle one of a plurality of azimuth gate selectors 416 to be selected and a portion of the contents of the target location bit field of the target data word stored in register 211 is forwarded and stored in the selected one of the azimuth gate selectors 416. Associated with each of the plurality of azimuth gate selectors 416 is an individual one of a like plurality of azimuth gates 418. Each of gates 418 has an input from its associated one of azimuth gate selectors 416 and has an input from shaft encoder 420. Shaft encoder 420 generates binary numbers indicative of the angular position of the radar antenna. Logic circuits in azimuth gate 418 compare the portion of the target location information stored in the associated one of azimuth gate selectors 416 and indicating the particular radial sweep on which a target is to be displayed with the binary number output from shaft decoder 420. Upon there being a match between these two numbers, there is an output from gate 418 to azimuth trace width circuit 214 indicating it is time for the target to be traced.

I will now briefly describe how a radar video signal is generated by azimuth trace width circuit 214 having the appropriate pulse width to properly trace the simulated target. As mentioned previously, part of the target data word stored in register 211 is an azimuth trace width bit field which is coupled into the one of a plurality of azimuth trace width circuits 214 that is permanently associated with the chosen one of azimuth gate selector circuits 416. More particularly, as an idle one of azimuth gate selectors 416 is selected by sequencer 617, its associated idle one of azimuth trace width circuit 214 is also selected and the contents of azimuth trace width bit field of the target data word stored in register 211 is forwarded and stored in the associated circuit 214. At the proper moment in time, as indicated by the output signal from the associated gate 418, the video output lead from azimuth trace width circuit 214 has a signal thereon of a duration necessary to trace the target with the proper trace width.

The video signal output from azimuth trace width circuit 214 must be timed to begin when the electron beam of the CRT is scanning the proper one of the radial display points. Strobe frequency and phase generator 521 applies signals to trace width circuit 214 to perform this function.

DETAILED DESCRIPTION

Figure 2:
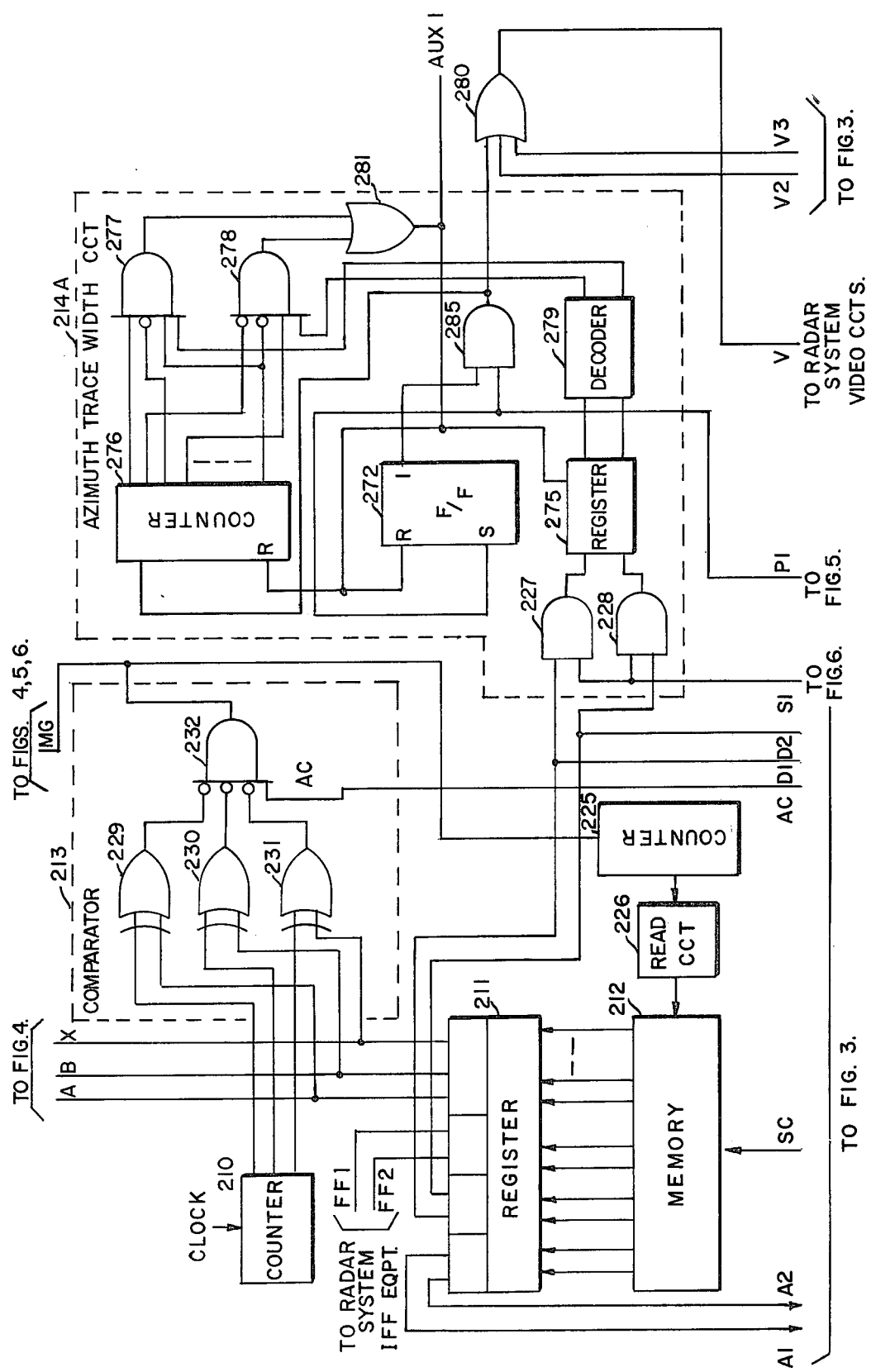
FIG. 2 is a schematic diagram of the scenario control circuitry and azimuth trace width circuit.
Figure 3:
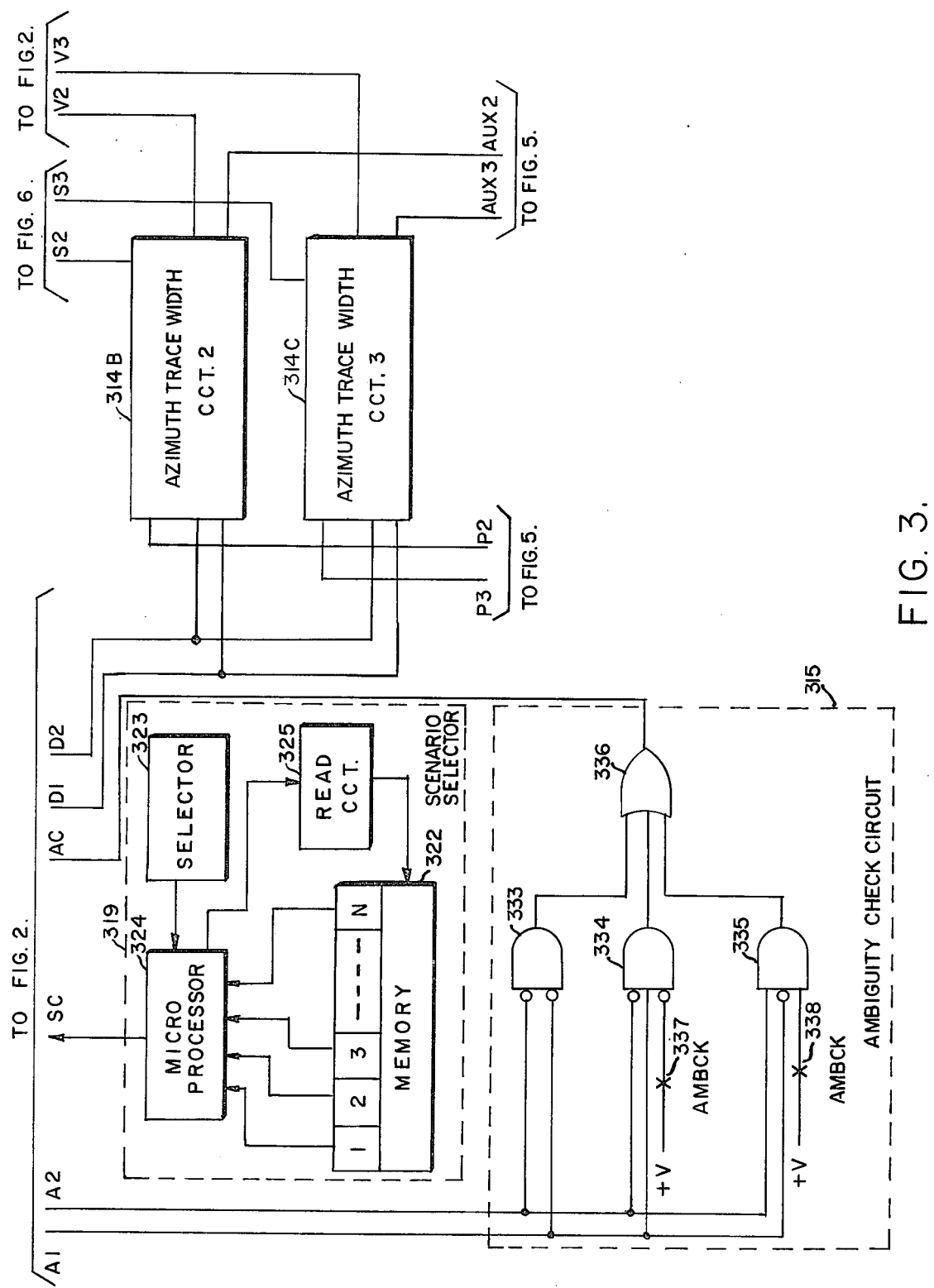
FIG. 3 is a schematic diagram of the ambiguity check circuit and the scenario selector circuit for assembling training scenarios.

Turning now to FIGS. 2 and 3 of the drawing to give a detailed description of my novel radar target generator. In FIG. 3 is seen scenario selector 319 which is used to assemble an almost infinite variety of training scenarios from files of individual target training scenario and terrain blanking which are stored in memory 322. An instructor utilizes selector 323 to instruct microprocessor 324 as to which individual target training scenario and terrain blanking files are to be read out of memory 322 and combined to produce a composite training scenario. In addition, selector 323 is utilized to control microprocessor 324 to modify the target position information of stored target data words of individual target scenarios and terrain blanking to translate and/or rotate the target path or terrain blanking when it is finally displayed on the radar display indicator. Processor 324 utilizes read circuit 325 to read out the selected files from memory 322 and then processor 324 assembles the composite training scenario to be displayed by interleaving the data word from the selected individual target scenario and terrain blanking files. The programming of processor 324 to perform these functions in response to commands from selector 323 is within the skill of those skilled in the art of programming small computers and microprocessors. As processor 324 processes and interleaves the selected individual target scenario and terrain blanking files read out of memory 322, the composite training scenario is forwarded over lead SC to be stored in memory 212 in FIG. 2. Memory 212 can be one of many types of memories available on the commercial market so is not described in detail herein.

When my novel radar target generator is activated to place the composite training scenario stored in memory 212 on the radar system CRT, counter 210 is set to zero while counter 225 is initially set to a count of one. In response to the one count in counter 225, read circuit 226 causes the first target data word of the training scenario stored in memory 212 to be read out in parallel format and placed in register 211. As discussed briefly heretofore in this specification, each data word is made up of a number of bit fields each providing information used in the functioning of my target generator. More particularly, there are four bit fields in each data word. More bit fields could be added for special functions. The ambiguous target bit field is made up of two binary bits and indicates whether or not the target represented by the data word stored in register 211 is an ambiguous target. The two ambiguous target bits are connected via leads A1 and A2 to ambiguity check circuit 315 in FIG. 3. A detailed description of the operation of ambiguity check circuit 315 is given further in this specification.

The second bit field of each target data word indicates the azimuth trace width of the target to be displayed on the radar display indicator. The azimuth trace width information may be varied each time the particular target is being traced on the radar display indicator to realistically display such characteristics as changing target profile to the radar beam, as well as displaying targets of different size, range gate splitting, etc. The bits in the azimuth trace width bit field of data words stored in register 211 are coupled via AND gates 227 and 228 into azimuth trace width circuit 214A shown in FIG. 2. These same bits are also coupled via leads D1 and D2 into azimuth trace width circuits 314B and 314C in FIG. 3. Circuits 214A, 314B and 314C are all identical so only 214A is shown in detail to avoid cluttering the drawing. The need for more than one azimuth trace width circuit and the selection thereof is described further in this specification. While FIG. 2 shows only two leads coupling the azimuth trace width bit field of the target data word stored in register 211 to the azimuth trace width circuits, 214A, 314B and 314C, the use of two leads is for discussion purposes only. As is well known in the art, two binary bits can indicate a maximum of four numbers which would, in this case, indicate only four possible azimuth trace widths. In any particular implementation of my invention it would probably be advantageous to utilize three or even four azimuth trace width bits in order to utilize eight or even sixteen azimuth trace widths in order to realistically display targets. This has not been done in FIG. 2 in order to avoid cluttering up the drawing, but two azimuth trace width bits are shown in order that the use of the azimuth trace width circuit may be understood. One skilled in the art may expand the circuitry to function with three or four bits.

A third bit field of each target data word is the friend or foe bit field and is used to specify whether the simulated target represented by the target data word is frient or foe. The friend or foe bits are coupled via leads FF1 and FF2 to the radar system identification friend or foe equipment to be used in a manner well known in the art to place a friend or foe identification tag adjacent to the target represented by the data word stored in register 211. The fourth bit field of the target data word indicates the display position of the target on the face of the radar CRT. In this particular embodiment of my invention there are 100 radial traces for each of the 360° to make up a complete radial sweep on the CRT, and there are fifty finite points defined along each radial trace. This makes up a total of 1,800,000 discrete points defined on the face of the radar display indicator at which targets may be displayed. As is obvious to one skilled in the art, twenty-one binary bits are required in the target location bit field of target data words to represent this number of finite points. As shown in FIG. 2, only three leads are shown output from the target location bit field to exclusive OR gates 229, 230 and 231 in comparator circuit 213 of FIG. 2. This smaller number of gates and leads connected thereto are shown in order that the drawing will not be cluttered. It is to be understood that there are actually twenty-one exclusive OR gates to handle the twenty-one binary bit stored in the location bit field of a target data word stored in register 211.

Gates 229, 230 and 231 in comparator 213 are each two input exclusive OR gates each having one of its two inputs connected to one of the bits of the target location bit field. The other of the two inputs of each of these gates is connected to one of the bits of counter 210. Counter 210 is advantageously driven by the radar system clock. The contents of the stages of counter 210 define a binary number and individual binary numbers appearing in counter 210 define each of the 1,800,000 discrete points on the face of the radar display indicator for a complete revolution thereon. Counter 210 is designed such that it resets itself to zero upon reaching the count of 1,800,000 in order that it will recount from zero in synchronization with each revolution of the radar display indicator electron beam. It could also be reset by shaft encoder 420.

With exclusive OR gates 229, 230 and 231 being connected to both counter 210 and the target location bit field of the target data word stored in register 211, there will be a low output from each and every one of these exclusive OR gates only when the two binary numbers match. As is shown in FIG. 2, the outputs from exclusive OR gates 229, 230 and 231 are all input to the inverted inputs of AND gate 232. There is one other input to AND gate 232 via lead AC which carries outputs signals from ambiguity check circuit 315 in FIG. 3. The signal on lead AC which is input to AND gate 232 in comparator 213 will be high for each target that is to be displayed upon there being a match of the binary numbers in counter 210 and register 211 is just described.

With all inputs to AND gate 232 being high, the output of this gate will also be high causing operation of other circuits in my target generator as described further in the specification.

Turning now to FIG. 3 to describe the operation of the ambiguity check circuit 315, therein is shown a circuit comprising four logic gates. The ambiguity check information stored in the ambiguity check bit field of the target data word stored in register 211 is applied via lead A1 and A2 to the inputs of AND gates 333, 334 and 335 as shown. The outputs of these gates is input to OR gate 335, the output of which is applied via lead AC to comparator 213 as previously mentioned. Nonambiguous targets which are always to be displayed will have zeros stored in the two binary bits of the ambiguity check bit field of the target data word stored in register 211. Ambiguous targets which are to be displayed when the radar system ambiguity check is not operated have a zero and one stored in the higher and lower bits respectively. Ambiguous targets which are not normally displayed when the ambiguity check is not operated, but which are displayed when the ambiguity check button is operated, have a one and a zero stored in the higher and lower binary bits respectively.

AND gate 333 is ambiguity check circuit 315 has two inverted inputs as shown, and when the two inputs have only zeros applied thereto for a nonambiguous target that is to always be displayed, the output of AND gate 333 is high. This causes the output of OR gate 336 to be high which thereby makes the ambiguity check input of AND gate 232 in comparator 213 to be high causing a target to be displayed upon there being a match in the contents of counter 210 and the target location information stored in register 211.

In the case of an ambiguous target which is normally displayed when the radar system ambiguity check is not operated, the one bit present on lead A1 is applied to the noninverted input of AND gate 334 and the zero bit present on lead A2 is applied to the inverted input of AND gate 334. The third input to AND gate 334 is also an inverted input and this input is normally low when ambiguity check contact 337 is not operated. Thus, an ambiguous target that is normally to be displayed when the ambiguity check button is unoperated, will cause the output of AND gate 334 to be high which is again coupled via OR gate 336 and lead AC to AND gate 232 in comparator 213 resulting in the display of this ambiguous target by allowing an output from AND gate 232 as previously described. When the ambiguity check button is operated, contact 337 is closed applying a positive potential to the inverted input at AND gate 334 which thereby causes the output of this gate to go low resulting in a zero being applied via lead AC to AND gate 232. The ambiguous target will therefore not be displayed in the position corresponding to the binary target data word which contains $A1=1$ and $A2=0$ in the header.

Finally, AND gate 335 is used to enable the display of an ambiguous target when the ambiguity button is operated and vice versa. In this case, bits A1 and A2 in the header of the second of the two target data words associated with an ambiguous target allow the output of gate 335 to go high when the ambiguity check switch 338 is closed manually or automatically. This ambiguous target, which is not displayed, unless an ambiguity check is made has a zero applied via lead A1 to the inverted input of AND gate 335. The one bit is applied via lead A2 to the noninverted input of AND gate 335. When the ambiguity check is unoperated the third input to AND gate 335 is low and the target will not be displayed as the output from AND gate 335 will also be low causing a low or zero to be applied via lead AC to AND gate 232 in comparator 213 for that target data word. Upon the operation of the ambiguity check button contact 338 is closed applying a positive potential to the third input of AND gate 335, and the ambiguous target will then be displayed as the output of AND gate 335 goes from a zero to a one state which is applied by OR gate 336 and lead AC to AND gate 232 to cause an output from gate 232 as previously described.

In view of the description of ambiguity check circuit 315 given above, it can be seen that nonambiguous targets are displayed whenever they occur, and only one of the two ambiguous targets is displayed depending upon whether or not the ambiguity check is operated. As the ambiguity check is operated, the ambiguous target jumps from a first position to a second position on the face of the radar display indicator to realistically portray the scenario.

A high output from AND gate 232 in comparator 213, indicating that a target is to be traced, is applied to counter 225, incrementing the counter, and thereby causing read circuit 226 to read the next target data word for the training scenario out of memory 212 and into register 211 which is now cleared from the previous target data word. Although not shown in FIG. 2, the signal used to increment counter 225 can also be used to clear register 211 in preparation for storage of the next target data word.

The signal output from AND gate 232 is also applied via lead MG to one of the two inputs of each of AND gates 439, 440 and 441 in circuits 442, 443 and 444 respectively. The second input to AND gates 439, 440 and 441 is from flip-flops 445, 446 and 447 as shown. These flip-flops are used to temporarily store the higher order bits of the binary coded target location information originally stored in the target location bit field of the target data word stored in register 211 and then cleared therefrom for the storage of a subsequent target data word. These higher order bits indicate on which of the 36,000 (in this example) radial traces the target trace is to be initiated. The azimuth position for initiation of the trace does not have to be exact because of the normally very small (0.01 degree in this example) increments between successive radial traces on the PPI. As seen in FIG. 2, these higher order bits of the target word stored in register 211 are applied via representative leads A, B, through X to the set inputs (S) of flip-flops 445, 446 and 447 to store the target location information therein temporarily. For simplicity of understanding the invention only circuits 442, 443 and 444 are shown in the drawing for illustration. However, it should be obvious that the exact number of these circuits are required to temporarily store the required higher order bits of target location information. For coincidence with the shaft encoder bits will depend on the resolution (and, hence, number of bits) of the shaft encoder used.

It should be noted that the Q outputs of flip-flops 445, 446 and 447 are connected to the second inputs of each of AND gates 439, 440 and 441. Upon one of the target location bits being a one the flip-flop in which this bit is stored is placed on its one state with its one output being high. Target location bits that are at a zero state do not cause their associated flip-flops to be placed in their one state, thus the one output of the associated flip-flop remains low or has a zero output therefrom. Thus, the target location bit field information is stored on flip-flops 445, 446 and 447 and is applied to AND gates 439, 440 and 441.

Upon their being an output from AND gate 232 in comparator 213, indicating a match between the contents of counter 210 and the target location bit field in register 211, the high output from gate 232 on lead MG energizes the second input of AND gates 439, 440 and 441 to pass the fifteen higher order bits of target location information stored in flip-flops 445, 446 and 447 to other circuitry as will soon be described. Following the transfer of this target location information the next clock signal appearing on lead 448 and applied to the reset inputs (R) of flip-flops 445, 446 and 447 will cause these flip-flops to be reset in preparation for storage of the appropriate target location information of the next target data word to be stored in register 211.

Figure 4:
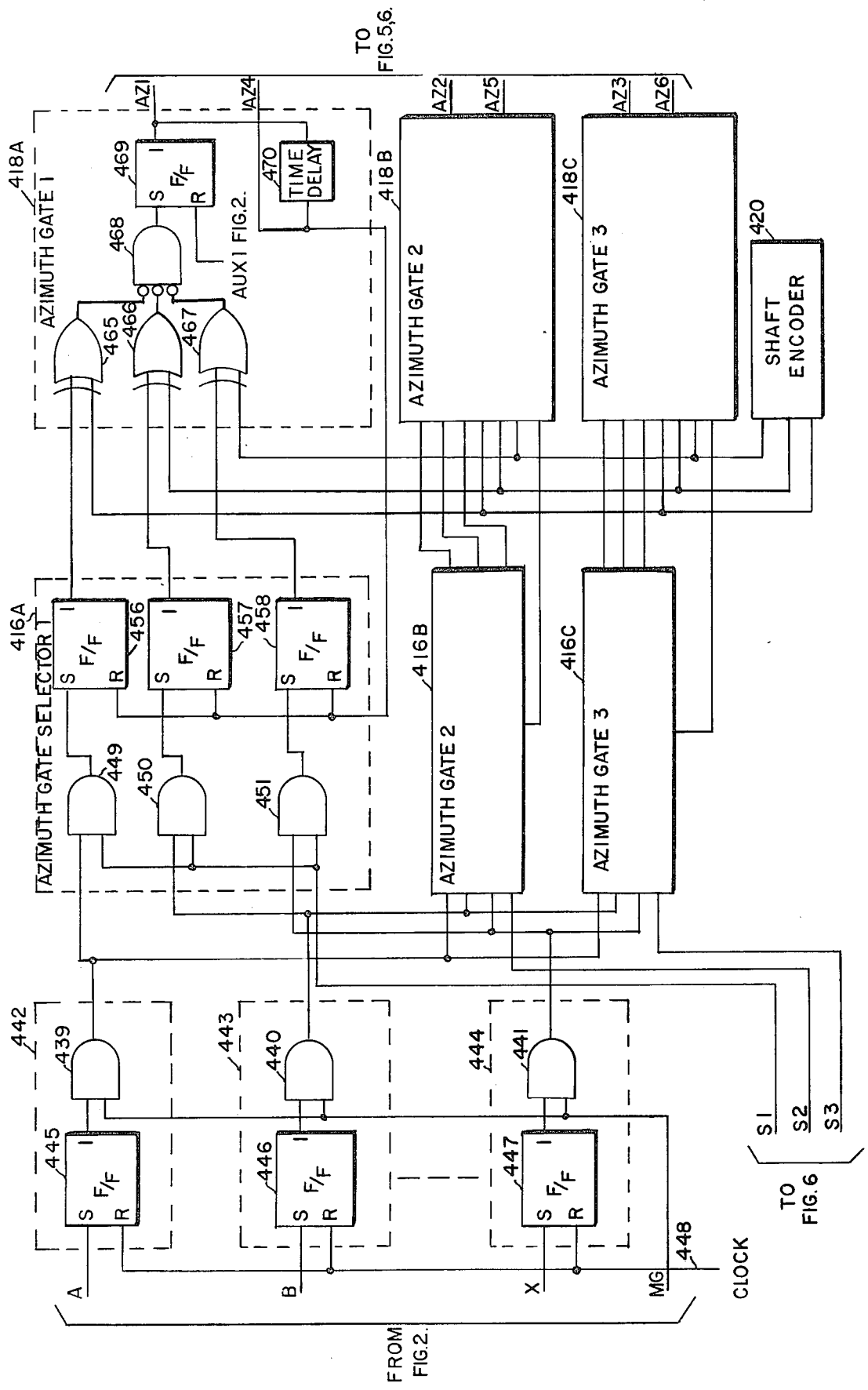
FIG. 4 is a schematic diagram of the azimuth gate select circuits and the azimuth gate circuits.

To account for the realism of antenna wind loading, where same exists, and in accordance with this embodiment of my invention, there will be a small time period between the time that there is an output on lead MG from AND gate 232 indicating a binary number match and the time that the target represented by this match will be displayed. In the interim period, the target location information briefly held in flip-flops 445, 446 and 447 must be stored until the shaft encoder bits match the higher order bits in the target data word. To provide this required storage azimuth gate selectors 416A, 416B and 416C with their individually associated ones of azimuth gates 418A, 418B and 418C are utilized as shown in FIG. 4. Idle ones of azimuth gate selectors 416A, 416B and 416C are selected by sequencer 617 in FIG. 6 as will soon be described.

Of azimuth gate selectors 416A, 416B and 416C, only the circuit details of selector 416A are shown. Selectors 416B, and 416C are identical to selector 416A so they are not shown in detail in the drawing in order that the drawing will not appear cluttered.

The target location information output from circuits 442, 443 and 444 is applied to the input of each of azimuth gate selector circuits 416A, 416B and 416C as shown. These outputs are connected to one of the two inputs of AND gates 449, 450 and 451 in selector 416A. The outputs are also similarly connected to AND gates (not shown) in selector circuits 416B and 416C.

Although only three AND gates 449, 450 and 451 are shown in the drawing to provide an understanding of the invention without cluttering of the drawing, it is to be understood that the number of AND gates to be used will depend on the resolution of the shaft encoder used. AND gates 449, 450 and 451 each have their second input connected to lead S1 as shown. Similarly, the AND gates (not shown) of selector circuits 416B and 416C have inputs from leads S2 and S3 respectively. Signals on leads S1, S2 and S3 are used to selectively energize the input gates of selectors 416A, 416B and 416C to transfer the target location information stored in circuits 442, 443 and 444 into the selected one of azimuth gate selector circuits 416A, 416B and 416C.

Figure 6:
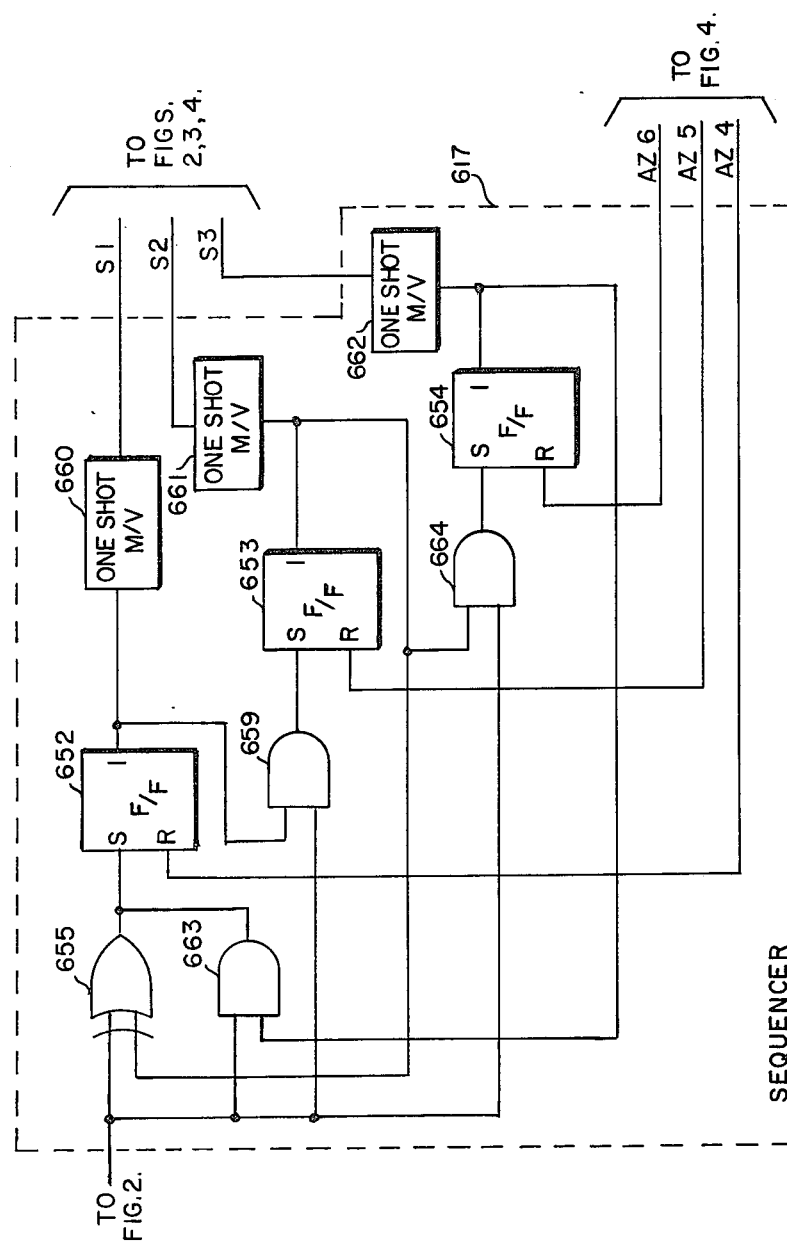
FIG. 6 is a schematic diagram of the sequencer circuit which controls the selection of other circuits.

Before continuing with the description of azimuth gate selector 416A, I now turn to describe sequencer 617 in FIG. 6 which causes selection of idle ones of azimuth gate selectors 416A, 416B and 416C via signal on leads S1, S2 and S3. Sequencer 617 has a signal input via lead MG which is the signal generated by comparator 213 whenever there is a match between the binary counts in counter 210 and the target location information stored in register 211. The other inputs to sequencer 617 are on leads AZ4, AZ5 and AZ6 which indicate that a target trace has been initiated and, therefore, the information stored in the particular ones of azimuth gate selectors 416A, 416B and 416C may be erased as it is no longer required. AUX 1, AUX 2 and AUX 3 which indicate the termination of the trace may be used also as the reset. The outputs from sequencer 617 are on leads S1, S2 and S3 and are used to operate the AND gates, such as AND gates 449, 450 and 451 of selector 416A, to gate the target location information into idle ones of selectors 416A, 416B and 416C.

Initially, flip-flops 652, 653 and 654 in sequencer 617 are in their reset states with their one outputs low. Upon a signal appearing on input lead MG indicating the first match condition detected by the circuitry of comparator 213, the signal on lead MG is passed by exclusive OR gate 655, the other input of which is now low to flip-flop 652 which is thereby placed in its set state. With flip-flop 652 being in its set state, its one output is high and this signal is shaped by one-shot multivibrator 660 and then is applied via lead S1 to one of the two inputs of AND gates 449, 450 and 451 in azimuth gate selector 416A as shown in FIG. 4. Thus, the target location information stored in circuits 442, 443 and 444 is gated into selector 416A to place the appropriate ones of the flip-flops 456, 457 and 458 therein into their set and reset states to store the fifteen bits of target location information. With the target location information being stored in flip-flops 456, 457 and 458 the one output of these flip-flops have signals present thereon indicative of radial trace portion of the target location information.

With flip-flop 652 in sequencer 617 being in its one state, its high one output is applied to one of the two inputs of AND gates 659. As already described, once a match signal is applied to lead MG by comparator 213, the next target data words stored in memory 212 is placed in register 211. At the same time, the target location bit field of this word in register 211 is applied via leads A, B and X to be stored on flip-flops 445, 446 and 447 which have been cleared of the previous target location information by toggling their reset inputs. Upon their being a second binary number match detected by comparator 213, in the manner previously described, the second match signal is applied to lead MG. This match signal is again passed by exclusive OR gate 655 to the set input of flip-flop 652, but this flip-flop is already in its set state so does not recognize this second match signal. The second match signal on lead MG, however is applied to the second input of AND gate 659 which now has both inputs high and its output goes high to place flip-flop 653 in its one state. This causes the one output of flip-flop 653 to go high and the positive transition causes the optional compensating one-shot multivibrator 651 to generate a timed pulse on lead S2 which is applied to azimuth gate selector 416B to gate the target location information stored on flip-flops 445, 446 and 447 into selector 416B in the same manner as previously described for selector 416A.

With flip-flop 653 being in its set state, with its one output high, this high output is applied to one of the two inputs of AND gate 664 and is also applied to the second of the two inputs of exclusive OR gate 655. As long as this second input to exclusive OR gate 655 is held high, further match signals occuring on a lead MG cannot be passed by exclusive OR gate 655 to flip-flop 652. This prevents 652 from being retriggered until 654 is triggered (set).

Upon the third match signal appearing on lead MG, the signal is not passed by exclusive OR gate 655 for the reasons just described, and is not passed by AND gate 663 as only one of the two inputs thereof is high, but the signal is passed by AND gate 659 the first input of which is still held high by flip-flop 652. As flip-flop 653 is already in its set state, however, no circuit changes occur. This third match signal on lead MG is also passed by AND gate 664 which now has both its inputs high and flip-flop 654 connected thereto is placed in its set state. The one output of flip-flop 654 goes high causing optional compensating one-shot multivibrator 662 to generate a pulse on a lead S3 which is used to gate the target location information for the third target data word into selector 416C in the same manner in which the first target location information was transferred into and stored in selector 416A.

With target location information stored in all of azimuth gate selectors 416A, 416B and 416C, there is no room to store further target location information but, as a design factor, by this time in the operation of the circuit the first and possibly the second targets represented by the target location information stored in selector 416A and 416B have been traced and these circuits have been cleared. Upon the targets being traced for the first and second target data words, the target location information of which was stored in selectors 416A and 416B, signals appear on leads AZ4 and AZ5 which cause flip-flop 652 and flip-flop 653 in sequencer 617 to be returned to their reset state. The generation of the reset signals on leads AZ4 and AZ5 is described further in this specification.

In the event that only flip-flop 652 has been returned to its reset state, the next or fourth match signal on lead MG cannot be passed by exclusive OR gate 655 as the second input of this gate is being held high by flip-flop 653 being in its set state as previously described. Therefore, the fourth match signal is passed by AND gate 663 the second input of which is held high by flip-flop 654 and is used to place flip-flop 652 into its set state. Again, an output appears on the one output of flip-flop 652 which causes one-shot multivibrator 660 to generate a pulse which causes the fourth target data word target location information to be gated into azimuth gate selector 416A.

In the event that flip-flops 652 and 653 in sequencer 617 were both in their reset states the fourth match signal on lead MG is passed both by exclusive OR gate 655 and AND gate 663 to place flip-flop 652 in its set state. Thus, sequencer 617 accomplishes its function of causing target location information stored on flip-flops 445, 446 and 447 into idle ones of azimuth gate selectors 416A, 416B and 416C.

Returning now to FIG. 4, as previously described, target location information is stored in flip-flops in each of azimuth gate selectors 416A, 416B and 416C. In selector 416A these flip-flops are 456, 457 and 458. Accordingly, the one output of flip-flops 456, 457 and 458 are either high or low reflecting the radial sweep portion of the target location information. The outputs of the flip-flops in selector 416A are input to exclusive OR gates 465, 466 and 467 in associated azimuth gate 418A. Similarly, the target location information stored on the flip-flops (not shown) in gate selectors 416B and 416C are applied to their associated ones of azimuth gates 418B and 418C.

The second input of each of exclusive OR gates 465, 466 and 467 in gate 418A, is connected to shaft encoder 420. The exclusive OR gates (not shown) in azimuth gates 418B and 418C similarly have their second inputs connected to the output from shaft encoder 420. Shaft encoder 420 generates a binary number indicative of the particular azimuth position of the antenna of the radar system with which my novel equipment functions. Due to wind loading effects on the antenna of the radar system the antenna is not physically located at each of the azimuth points at equal time intervals and, therefore, the azimuth gate selectors and azimuth gates are required to temporarily store target location information until there is a match with the actual antenna location. In this manner, the targets generated by my circuitry will be moved on the face of the radar display indicator to realistically provide antenna wind loading to the radar operator when an actual antenna is being used. Note that this circuitry can be eliminated when an actual antenna is not being used.

Upon there being a match between the target location information stored on the flip-flops of gate selector 416A and the radar antenna position information generated by shaft encoder 420, there will be matched inputs on each of exclusive OR gates 465, 466 and 467. As a result, the outputs of all these gates must be low. As all the inputs of AND gate 468 are inverted, all the low outputs from exclusive OR gates 465, 466 and 467 cause all inputs of AND gate 468 to be high and this AND gate then provides a high output which places flip-flop 469 in its set state. The one output of flip-flop 469 thereby goes high indicating that the target represented by the target location information stored in selector 416A is to be traced on succeeding radial traces. The correct range as "remembered" by the strobe frequency and phase generator. The signal appearing on the one output of flip-flop 469 is also used to remove the stored informaton in its associated azimuth gate selector 416A as this information is no longer needed. To accomplish this function, the signal at the one output of flip-flop 469 is delayed for a short period of time by time delay circuit 470 which then generates a signal which is applied to flip-flop 469 to return this flip-flop to its reset state, and the delayed signal is also applied to the reset inputs of flip-flops 456, 457 and 458 in gate selector 416A to return these flip-flops to their reset state. FF 469 itself is reset by the output from OR gate 281 called AUX 1 which indicates that the trace of width specified by the header bits has been completed on the PPI. The delayed signal from the time delay 470 is also applied via lead AZ4 to sequencer 617 to perform the previously described reset function. In addition, the signal on lead AZ4 is applied to strobe frequency and phase generator 521 for reset purposes as described hereinafter in this specification. At this time azimuth gate selector 416A and its associated azimuth gate 418A are prepared to receive target location information for another target. Azimuth gate selectors 416B and 416C and their associated azimuth gates 418B and 418C function in the identical same manner.

Figure 5:
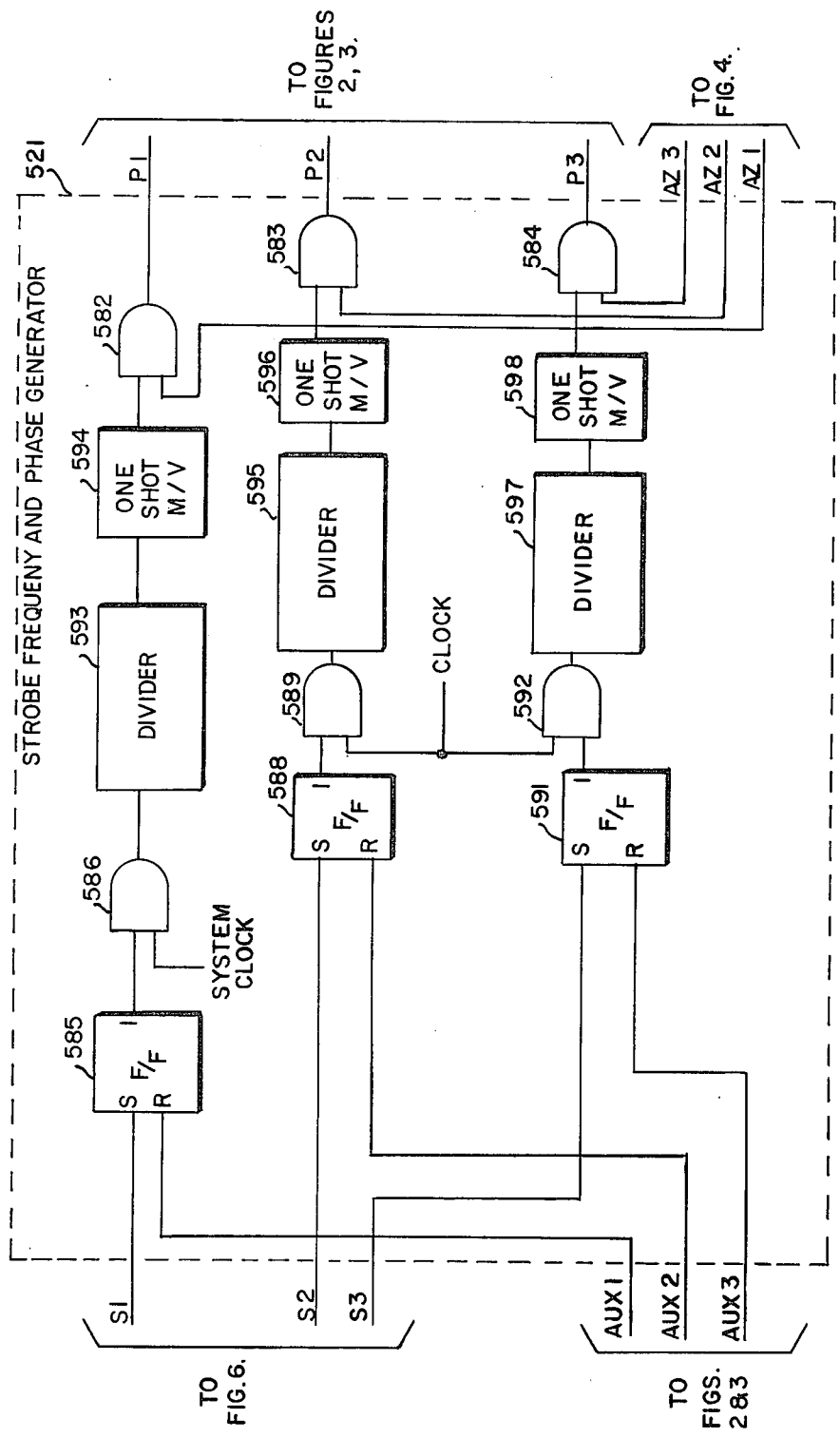
FIG. 5 is a schematic diagram of the strobe frequency and phase generator circuit which control the operation of the azimuth trace width circuits.

The output from azimuth gate circuits 418A, 418B and 418C on leads AZ1, AZ2 and AZ3 respectively are used in conjunction with strobe frequency in phase generator circuit 521 in FIG. 5 to operate azimuth trace width circuits 214A, 314B and 314C which are described in detail further in this specification. The signals on leads AZ1, AZ2 and AZ3 are applied to AND gates 582, 583 and 584 in strobe frequency and phase generator 521 as shown in FIG. 5. Upon their being a second input to these AND gates from the circuitry in generator 521, which will now be described, there is an output on leads P1, P2 and P3 which are applied to azimuth width circuits 214A, 314B and 314C causing their operation.

Generator 521 consists of three (any number could be used) sets of circuitry each of which is associated with one of azimuth trace width circuits 214A, 314B and 314C. These circuits are triggered into operation by the selection signals on leads S1, S2 and S3 from sequencer 617. Thus, an azimuth trace width circuit, an azimuth gate selector, an azimuth gate and a portion of generator 521 are chosen by the signals on leads S1, S2 and S3 generated by sequencer 617. As can be seen in FIG. 5, the selection signal on lead S1 places flip-flop 585 into its set state, while the selection signal on lead S2 will place flip-flop 588 into its set state and the selection signal on lead S3 will place flip-flop 591 into its set state. With any one of flip-flops 585, 588 and 591 in their set state their one output will be high, and it can be seen in FIG. 5 that these outputs are one of the two inputs to AND gates 586, 589 and 592 respectively. The other of the two inputs to AND gates 586, 589 and 592 are from the radar system clock. This clock is the same clock that drives counter 210. Thus, the operation of flip-flops 585, 588 or 591 causes clock signals to be gated into divider circuits 593, 595 or 597 respectively. Dividers 593, 595 and 597 each divide the clock signals being input thereto by fifty (in this example) to provide an output signal once per each radial trace of the radar display indicator. When an ambiguity check is made, this clock is changed by the radar system. If it were not changed, then programmable dividers such as MC 74418's could be used. Dividers 593, 595 and 597 each keep providing an output pulse per each radial trace of the radar display indicator as long as their associated ones of flip-flops 585, 588 and 591 remain in their set states. Each output pulse from dividers 593, 595 and 597 are applied to their associated one of one-shot multivibrators 594, 596 and 598 which are used only to provide pulses of a given time duration and optional compensating time delay. The output from one-shot multivibrators 594, 596 and 598 are applied to one of the two inputs of the associated ones of AND gates 582, 583 and 584, the other inputs of which are via leads AZ1, AZ2 and AZ3 as described previously.

As previously described, sequencer 617 responds to signals on lead MG from comparator 213 indicating a target to be displayed and a signal appears on one of leads S1, S2 and S3 output from sequencer 617. Thus, the selected one of dividers 593, 595 and 597 selected by the pulse on the associated one of leads S1, S2 and S3 starts counting at the moment in time that the target is to be traced. If, for example, the target would be traced starting at the thirty-fifth time division along the radial trace being scanned when the pulse is output from comparator 213, each succeeding pulse output from the selected one of the dividers 593, 595 and 597 will also occur when the display indicator electron beam is positioned at the 35th time division of each succeeding radial trace. As described previously, dividers 593, 595 and 597 each continue generating pulse outputs for each radial trace as long as their associated one of flip-flops 585, 588 and 591 are in their set states. Also as mentioned, these pulses are regenerated by multivibrators 594, 595 and 597 and then applied to one of the two inputs of AND gates 582, 583 and 584. After a short time period caused by antenna wind loading, as described heretofore, a signal is received on an appropriate one of leads AZ1, AZ2 and AZ3 indicating that a target is to be traced. The next output from the particular one of dividers 593, 595 and 597 will result in an output from the particular one of AND gates 582, 583 and 584 to output leads P1, P2 and P3 respectively. In this manner, strobe frequency and phase generator 521 assures that a target will be traced at its proper range even after accounting for small time delays caused by wind loading and other motor speed variations.

The trace pulses output from strobe frequency and phase generator circuit 521 on leads P1, P2 and P3 are input to azimuth trace width circuits 214A, 314B and 314C respectively. As all three of these azimuth trace widths circuits are identical only the details of azimuth trace width circuit 214A are shown in detail.

As described previously, the azimuth trace width information stored in the azimuth trace width bit field of the target data word stored in register 211 is transferred and stored in register 275. This occurs because sequencer 617 applies a selection signal to lead S1 which gates the trace width bits through AND gates 227 and 228 to be stored in register 275. The azimuth trace width bits stored in register 275 are decoded by decoder 279 and are applied to logic circuits represented by AND gates 277 and 278. Representative logic gates 277 and 278 also have inputs from counter 276. Upon there being a match between the contents of particular stages of counter 276 and the outputs of decoder 279, there will be an output from one of logic gates 277 and 278 to OR gate 281. It would be obvious to one skilled in the art how to design such a comparator utilizing logic gates. In this particular embodiment of my invention, with only two azimuth width trace bits, only four possible azimuth trace widths are utilized. The particular design of the comparator represented by AND gates 277 and 278 is made by one skilled in the art depending upon the actual trace width chosen for each of the four possible trace widths provided for by the two azimuth trace widths bits in this particular embodiment of my invention.

Upon there being a match between the contents of counter 276 and the outputs from decoder 279 to logic gates 277 and 278, there will be an output from these logic gates to OR gate 281 and, in turn, there will be an output from OR gate 281 called AUX 1 which is applied to the reset inputs of flip-flops 271 and 272, register 275 and counter 276. The appearance of AUX 1 denotes the end of the trace; i.e., the selected point width specified by the header bits has been reached. AUX 2 and AUX 3 function in a corresponding manner in 314B and 314C.

Now that the operation of circuitry within azimuth trace width circuit 214A has been described in detail, I describe how circuit 214A generates a pulse of an appropriate timed duration to be applied to the radar system video circuitry to trace the target with the proper trace width. As previously described, there is a signal on lead P1 at the proper moment in time when the target is to be traced on the radar display indicator. This signal on lead P1 is applied to the set inputs of flip-flop 272 and AND gate 285 which is one of the three inputs to OR gate 280 as shown. Flip-flop 272 is thereby placed in its set state with its one output high which is coupled to AND gate 285. The output from OR gate 280 is applied via lead V to the radar system video circuits (not shown). The period that there is an output on lead V is determined by counter 276 and logic circuits 277 and 278 and the reset signal generated thereby that returns flip-flop 272 to its reset state. In this manner, flip-flop 272 is returned to its zero state as previously described, terminating the signal on video lead V for the proper azimuth trace width for the target being painted on the radar display indicator. Similarly, video pulses are generated in circuits 314B and 314C which are applied via leads V2 and V3 to OR gate 280.

In an alternative embodiment of the invention in which radar antenna wind loading is not taken into account, targets will be traced on the radar display indicator immediately upon there being an output from AND gate 232 of comparator 213 to lead MG. In this simplified embodiment of my invention, circuits 442, 443 and 444 are not required, azimuth gates selectors 416A and 416B and 416C are not required, azimuth gate circuits 418A, 418B and 418C are not required, shaft encoder 420 is not required. For even simpler version for targets occuring one at a time sequencer 617 is not required. In addition, AND gates 227 and 228 and register 275 and azimuth trace width circuits 314B and 314C are not required and there is only one leg in the strobe frequency and phase generator. Instead, the azimuth trace width bits stored in the azimuth trace width bit field of the target data word stored in register 211 are applied directly to decoder 279. The output on lead MG is then applied to input lead S1 of strobe frequency and phase generator 521. Thus the video trace width signal generated by circuit 214A is generated immediately upon there being an output on lead MG.

What is claimed is:

1. A radar target generator for displaying targets on the display of a radar system having a clock the counts of which indicate a plurality of points on said display, said generator comprising
  storage means storing individual target scenarios, each scenario including a plurality of target display numbers each of which indicates one of said plurality of points,
  first means for selecting one or more individual target scenarios and interleaving the display numbers of the selected ones of said individual target scenarios when more than one scenario is selected to produce a composite target scenario,
  read out means for selecting sequential ones of said display numbers in said composite target scenario, and
  a comparator individually comparing said sequentially selected display numbers with the counts of said clock and providing a signal causing a target trace on said display whenever there is a match between said clock count and said display numbers.

2. The radar target generator of claim 1 wherein said first selecting means comprises processor means for interleaving display numbers of selected individual scenarios to produce a composite target scenario, and selector means utilized to select said individual scenarios for input to said processor, said selector means also being used for instructing said processor to modify the display numbers of ones of said selected individual scenarios by incrementing or decrementing the display numbers for translating and rotating the display of the particular targets.

3. The radar target generator in accordance with claim 1 wherein every target display number of each of said individual target scenarios contains information indicating the azimuth trace width of the target when it is traced on said display and further comprising
  means responsive to said azimuth trace width information of said display number and to said match signal generated by said comparator to generate a trace signal that is applied to said radar system to trace the target on said display with the azimuth trace width designated by said trace information.

4. The radar target generator of claim 3 wherein said radar system provides ambiguous target operation with ambiguity check apparatus used to determine which target returns represent ambiguous targets and all target display numbers of each of said individual target scenarios further includes ambiguity information indicating if the target represented by a particular display number is a real target to be displayed all the time, an ambiguous target to be displayed only when said ambiguity check apparatus is in a first state, or an ambiguous target to be displayed only when said check apparatus is in a second state, and further comprising
  check means responsive to said ambiguity information upon there being match detected by said comparator for suppressing the display of an ambiguous target depending on the operational state of the ambiguity check apparatus.

5. A radar target generator for displaying targets on the display of a radar system having a clock the counts of which can indicate a plurality of points on said display and having a shaft encoder providing a first signal indicating the azimuth position of the antenna of the radar system, said generator comprising
  first means for storing a target scenario for at least one target, each said scenario including a plurality of target display numbers each of which indicate one of said plurality of points on said display,
  means for reading sequential ones of said display numbers of said stored target scenario out of said first storage means,
  a first comparator individually comparing each of said sequentially selected display numbers with the counts of said clock and providing a second signal when there is a match between said clock count and one of said display numbers,
  second storage means used to store the display number input to said first comparator upon there being said second signal output from said comparator,
  a second comparator used to compare each of the display numbers stored in said second storage means with the first signal output from said shaft encoder and providing a third signal upon there being a match between said first signal and each of said display numbers in said second storage means,
  strobe means being activated by each of said second signals for generating a pulse train in response to each of said second signals, the period between pulses in each of said pulse trains being equal to the time of one radial trace on said display, the one of said pulses in a pulse train following a third signal causing a target trace on said display.

6. The radar target generator in accordance with claim 5 wherein said second storage means includes a plurality of second storage means, said second comparator includes a like plurality of second comparators associated with said plurality of second storage means on a one to one basis, said strobe means includes a like plurality of strobe means associated with said plurality of second comparators on a one to one basis, and further comprising a sequencer for selecting an idle one of said plurality of second storage means to store the display number input to said first comparator in response to said second signal generated by said first comparator.

7. The radar target generator in accordance with claim 6 wherein each of said display numbers includes information indicating the azimuth trace width on said display of the target represented by the corresponding one of said display numbers and further comprising azimuth trace width means jointly responsive to the one of said pulses in said pulse train following said third signal and to said trace width information to generate a signal that is applied to said display to trace a target.

8. The radar target generator in accordance with claim 7 further comprising
   third storage means storing a plurality of individual target scenarios and terrain blanking information, each of said scenarios including a plurality of target display numbers each of which indicates one of said plurality of points on said display,
   selector means for selecting one or more individual target scenarios and terrain blanking information stored in said storage means, and
   processor means responsive to said selector means for reading out the selected target scenarios and terrain blanking information from said third storage means and interleaving the target display numbers of the selected scenarios and deleting some of said display numbers in accordance with said blanking information to produce a composite target scenario, said selector means also being used to instruct said processor means to increment or decrement the count of each of the target display numbers of designated ones of said target scenarios to translate or rotate said designated target scenario to produce a number of composite target scenarios larger in number of target scenarios stored in said third storage means.

9. The radar target generator in accordance with claim 8 further comprising
   a counter counting in response to said radar system clock and providing count inputs to said first comparator, and
   fourth storage means for storing target display numbers sequentially read out of said first storage means and applying same to said first comparator until said first comparator indicates by way of said second signal that there is a match between said display number in said fourth storage means and the count in said counter.

10. The radar target generator in accordance with claim 9 wherein said radar system provides ambiguous target operation with ambiguity check apparatus, used to determine real targets from ambiguous targets and all target display numbers further includes ambiguity information indicating if the target represented by a particular display number is a real target displayed all the time, an ambiguous target normally displayed until the ambiguity check apparatus is in a second state, or an ambiguous target normally not displayed unless said check apparatus is in a first state, and further comprising
   ambiguity check means responsive to said ambiguity information in the one of said target display numbers stored in said fourth storage means to suppress the generation of said second signal by said first comparator for a normally displayed ambiguous target when said check apparatus is in said second state and for a not normally displayed ambiguous target when said check apparatus is in said first state.

11. The radar target generator in accordance with claim 10 wherein said target display numbers include information indicating if the target represented by a display number is a friend or foe, said friend or foe information being applied to said radar system for the display of an appropriate marker adjacent to the corresponding target trace.

* * * * *